US010572550B2

(12) United States Patent
Lefortier et al.

(10) Patent No.: US 10,572,550 B2
(45) Date of Patent: Feb. 25, 2020

(54) METHOD OF AND SYSTEM FOR CRAWLING A WEB RESOURCE

(71) Applicant: YANDEX EUROPE AG, Lucerne (CH)

(72) Inventors: Damien Raymond Jean-François Lefortier, Moscow (RU); Liudmila Alexandrovna Ostroumova, Yaroslavl (RU); Egor Aleksandrovich Samosvat, Moscow (RU); Pavel Viktorovich Serdyukov, Moscow (RU); Ivan Semeonovich Bogatyy, Moscow (RU); Arsenii Andreevich Chelnokov, Moscow (RU); Gleb Gennadievich Gusev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 299 days.

(21) Appl. No.: 15/326,045

(22) PCT Filed: Jan. 26, 2015

(86) PCT No.: PCT/IB2015/050575
§ 371 (c)(1),
(2) Date: Jan. 13, 2017

(87) PCT Pub. No.: WO2016/012868
PCT Pub. Date: Jan. 28, 2016

(65) Prior Publication Data
US 2017/0206274 A1   Jul. 20, 2017

(30) Foreign Application Priority Data

Jul. 24, 2014   (RU) ................................ 2014130448

(51) Int. Cl.
*G06N 99/00* (2019.01)
*G06F 16/951* (2019.01)
*G06N 20/00* (2019.01)

(52) U.S. Cl.
CPC ........... *G06F 16/951* (2019.01); *G06N 20/00* (2019.01)

(58) Field of Classification Search
CPC ............ G06F 17/30864; G06F 16/951; G06N 99/005; G06N 20/00
See application file for complete search history.

(56) References Cited

U.S. PATENT DOCUMENTS 7,594,011 B2   9/2009   Chandra
7,672,943 B2   3/2010   Wong et al.
(Continued)

FOREIGN PATENT DOCUMENTS

| WO | 2006108069 A2 | 10/2006 |
| WO | 2010027914 A1 | 3/2010 |
| WO | 2013064505 A1 | 5/2013 |

OTHER PUBLICATIONS

Ostroumova et al., Crawling Policies Based on Web Page Popularity Prediction, Mar. 13, 2014, retrieved on Apr. 29, 2015, retrieved from the Internet: <URL: https://events.yandex.com/research/2014/79/>.

*Primary Examiner* — Shew Fen Lin
(74) *Attorney, Agent, or Firm* — BCF LLP

(57) ABSTRACT

A method for determining a crawling schedule is disclosed, the method being executable at a crawling server coupled to a first web resource server and a second web resource server. The method comprises: acquiring a first new web page associated with the first web resource server; acquiring a second new web page associated with the second web resource server; determining a first crawling benefit parameter for the first new web page, the first crawling benefit parameter being based on a predicted popularity parameter and a predicted popularity decay parameter thereof; determining a second crawling benefit parameter for the second new web page, the second crawling benefit parameter being based on a predicted popularity parameter and a predicted popularity decay parameter thereof; based on the first crawling benefit parameter and the second crawling benefit
(Continued)

parameter, determining a crawling order for the first new web page and the second new web page.

20 Claims, 2 Drawing Sheets

(56) References Cited

U.S. PATENT DOCUMENTS

| | | | |
|---|---|---|---|
| 7,899,807 B2 | 3/2011 | Olston et al. | |
| 8,255,391 B2 | 9/2012 | Kulkarni | |
| 8,296,253 B2 | 10/2012 | Huberman et al. | |
| 8,954,447 B1* | 2/2015 | Chatterjee | G06F 16/4393 |
| | | | 707/748 |
| 9,092,489 B1* | 7/2015 | Dasilva | H04N 21/25883 |
| 2005/0071766 A1 | 3/2005 | Brill et al. | |
| 2007/0208583 A1* | 9/2007 | Ward | G06Q 10/00 |
| | | | 705/50 |
| 2008/0256046 A1* | 10/2008 | Blackman | G06F 17/30864 |
| 2009/0164425 A1* | 6/2009 | Olston | G06F 17/30864 |
| 2010/0114954 A1 | 5/2010 | Sareen et al. | |
| 2010/0223578 A1* | 9/2010 | Huberman | G06Q 99/00 |
| | | | 715/810 |
| 2010/0293116 A1* | 11/2010 | Feng | G06F 17/30864 |
| | | | 706/12 |
| 2010/0318484 A1* | 12/2010 | Huberman | G06Q 30/02 |
| | | | 706/46 |
| 2011/0087647 A1 | 4/2011 | Signorini et al. | |
| 2012/0011174 A1* | 1/2012 | Dham | H04N 21/23106 |
| | | | 707/813 |
| 2012/0303606 A1* | 11/2012 | Cai | G06F 17/30705 |
| | | | 707/709 |
| 2013/0144858 A1 | 6/2013 | Lin et al. | |
| 2013/0179424 A1 | 7/2013 | Xu et al. | |
| 2013/0226897 A1 | 8/2013 | Carver | |
| 2015/0186513 A1* | 7/2015 | Ionescu | G06F 17/30861 |
| | | | 707/709 |
| 2015/0324478 A1* | 11/2015 | Zhao | H04L 67/02 |
| | | | 707/709 |

* cited by examiner

METHOD OF AND SYSTEM FOR CRAWLING A WEB RESOURCE

CROSS-REFERENCE

The present application claims priority to Russian Patent Application No. 2014130448, filed Jul. 24, 2014, entitled "METHOD OF AND SYSTEM FOR CRAWLING A WEB RESOURCE" the entirety of which is incorporated herein.

FIELD OF THE TECHNOLOGY

The present technology relates to method of and system for crawling a web resource.

BACKGROUND

The Internet has grown to allow the user to access a plethora of information—from the latest news, watching movies on-line to checking a bank account balance through on-line banking, to ordering an airline ticket or a meal from a corner Chinese take-out place. In some situations, the user knows a particular web site that she is wishing to access. For example, when the user wishes to do her on-line banking with the Royal Bank of Canada, the user knows to access web site www.rbc.com. In other circumstances, the user may not be aware of a particular web site that addresses his needs and he may need to perform what is known a web search using one of search engines, such as YANDEX, GOOGLE, YAHOO! or the like. As is known, the user enters a search query and the search engine provides a list of web resources that are responsive to the search query in what is known as a Search Engine Results Page or SERP, for short.

As is also known in the art, in order to be able to include a particular web resource into the SERP, the search engine needs to "visit" the web resource and to index the information contained therein. This process is generally known in the art as "crawling" and the module associated with the search engine server responsible for the indexing is generally known as a "crawler" or a "robot".

Naturally, new web resources appear every day in ever-increasing numbers. It is a well established fact that none of the commercially available search engines is able to crawl every web resources as soon as it appears. This is due to the limited resources available at each of the search engines— after all, the search engine is typically a business venture and needs to operate its business in a prudent and cost-effective manner—hence, there no such thing as unlimited supply of computational power/equipment at any given search engine.

What tends to exacerbate the problem is that the content of web resources changes from time to time. The frequency of this change in information may change from one web resources to another web resource—it may be relatively fast (for example, a news portal may update content a several times in a given day) or relatively slow (for example, a home page of a major bank may rarely be updated and, even when updated, changes are mostly cosmetic in nature), but it does change nevertheless.

Therefore, it is known in the art to create a crawling schedule, which crawling schedule is followed by the crawler when crawling new resources or re-crawling previously crawled web resources for the updated content. Generally speaking, the crawling schedule is a strategy of a crawler to choose URLs to visit (or revisit) from a crawling queue. As such, the crawling schedule is known to prescribe the crawler: (i) when to download newly discovered web pages not represented in the search engine index and (ii) when to refresh copies of pages likely to have important updates and, therefore, change from the content saved in the search engine index.

U.S. Pat. No. 7,899,807 published on Mar. 1, 2011 to Olsten et al discloses an improved system and method for crawl ordering of a web crawler by impact upon search results of a search engine is provided. Content-independent features of uncrawled web pages may be obtained, and the impact of uncrawled web pages may be estimated for queries of a workload using the content-independent features. The impact of uncrawled web pages may be estimated for queries by computing an expected impact score for uncrawled web pages that match needy queries. Query sketches may be created for a subset of the queries by computing an expected impact score for crawled web pages and uncrawled web pages matching the queries. Web pages may then be selected to fetch using a combined query-based estimate and query-independent estimate of the impact of fetching the web pages on search query results.

U.S. Pat. No. 7,672,943 published on Mar. 2, 2010 to Wong et al teaches a web crawler system that utilizes a targeted approach to increase the likelihood of downloading web pages of a desired type or category. The system employs a plurality of URL scoring metrics that generate individual scores for outlinked URLs contained in a downloaded web page. For each outlinked URL, the individual scores are combined using an appropriate algorithm or formula to generate an overall score that represents a downloading priority for the outlinked URL. The web crawler application can then download subsequent web pages in an order that is influenced by the downloading priorities.

US patent application 2012/0303606 published on Nov. 29, 2012 to Cai et al discloses web crawling polices that are generated based on user web browsing statistics. User browsing statistics are aggregated at the granularity of resource identifier patterns (such as URL patterns) that denote groups of resources within a particular domain or website that share syntax at a certain level of granularity. The web crawl policies rank the resource identifier patterns according to their associated aggregated user browsing statistics. A crawl ordering defined by the web crawl polices is used to download and discover new resources within a domain or website.

SUMMARY

It is thus an object of the present technology to ameliorate at least some of the inconveniences present in the prior art.

Embodiments of the present technology have been developed based on inventors' appreciation that not every web resources is created equally—some can be said to be more important or more relevant to the general corpus of potential web users than the others. For example, a major national news web portal may be considered to be more generally relevant, than a blog of a fictitious "Joe Smith". As such, it may be more important for the crawler to crawl some of the newly created web resources faster than some other newly created web resources. Therefore potentially the most important (or popular) pages should be crawled with a higher priority.

There are several ways to measure the importance of a page, which all may lead to different ordering policies and measures of crawling performance. One natural measure of page importance is the number of user visits. For newly discovered URLs of newly created web resources, their popularity may not be easily available to the crawler.

For newly discovered URLs, their popularity is not currently observed, and therefore it should be predicted relying on their features, available at the time of their discovery. The inventors have analyzed the problem of new web page popularity prediction, in particular, they compare short-term and long-term popularity of new URLs. Generally speaking, inventors have developed a model for determining a crawling strategy that takes into account both short term popularity and a long term popularity. Embodiments of the present technology employ a machine learning algorithm whereby a model is trained using features from different sources. The machine learning algorithm is used to predict the rate of popularity decay which can be based on the short term popularity of the web pages. By short term popularity inventors mean the number of visits to the web page within a certain amount of time after the web page is created—such as a few hours, a few days and the like. By the rate of popularity decay inventors mean temporal dynamics of the web page popularity or, in other words, how fast it increases (for example from being new to being popular) and then how fast it decreases (i.e. from being very popular to not being popular).

Generally speaking, inventors have developed a crawling policy that takes into account the predicted rate of popularity decay for the web pages to be crawled and effectively re-ranks web pages to be crawled in the crawling line according to the popularity dynamics.

Inventors have uncovered that most prior art approaches are not suitable for the task at hand—for predicting popularity and the popularity decay for the newly created pages. This is due to the fact that most prior art approaches predict future popularity based on prior experience—for example, predicting future popularity of a given query-document pair based on the past click behaviour for the query-document pair. This is not applicable for newly created pages, as there is no past behaviour information available due to the short age of the newly created web page.

Some of the prior art solutions focus on the predicting of long term popularity based on the past popularity of the domain which hosts the new web resources. However, those models do not take into account the web page specific characteristics. Within today's domain structures, a given domain may host very different web pages with very different characteristics and levels of popularity. For example, for a news portal having a "latest news section" and 'arts and crafts" sections, following a major natural disaster and the associated reports, the popularity and the popularity decay of the news feed associated with the disaster in the latest news section will be very different from those in the arts and crafts section.

According to a first broad aspect of the present technology, there is provided a method of setting up a crawling schedule. The method is executable at a crawling server, the crawling server coupled to a communication network, the communication network having coupled thereto a first web resource server and a second web resource server. The method comprises: appreciating a first new web page associated with the first web resource server; appreciating a second new web page associated with the second web resource server; determining a first crawling benefit parameter associated with the first new web page, the first crawling benefit parameter being based on a predicted popularity parameter and a predicted popularity decay parameter of the first new web page; determining a second crawling benefit parameter associated with the second new web page, the second crawling benefit parameter being based on a predicted popularity parameter and a predicted popularity decay parameter of the second new web page; based on the first crawling benefit parameter and the second crawling benefit parameter, determining a crawling order for the first new web page and the second new web page.

In some implementations of the method, the method further comprises appreciating a first old web page associated with one of the first web resource server and the second web resource server, the first old web page having been previously crawled.

In some implementations of the method, the method further comprises determining a third crawling benefit parameter associated with the first old web-page, the third crawling benefit parameter being based on a predicted popularity parameter and a predicted popularity decay parameter of at least one change associated with the first old web-page.

In some implementations of the method, the method further comprises, based on the first crawling benefit parameter, the second crawling benefit parameter and the third crawling benefit parameter, determining a crawling order for the first new web page, the second new web page and re-crawling of the first old web-page.

In some implementations of the method, the method further comprises estimating respective predicted popularity parameter and predicted popularity decay parameter associated with the first new web page and the second new web page using machine learning algorithm executed by the crawling server.

In some implementations of the method, the method further comprises training the machine learning algorithm.

In some implementations of the method, the training is based on at least one feature selected from a list of:
number of transitions to all URLs in the pattern P: $V_{in}(P)$;
average number of transitions to a URL in the pattern $V_{in}(P)=|P|$, where $|P|$ is the number of URLs in P;
number of transitions to all URL's in the pattern P during the first t hours: $V^t_{in}(P)$;
average number of transitions to a URL in the pattern P during the first t hours: $V^t_{in}(P)=|P|$;
fraction of transitions to all URL's in the pattern P during the first t hours: $V^t_{in}(P)=V_{in}(P)$.

In some implementations of the method, the training is based on at least one feature selected from a list of:
number of times URLs in the pattern act as referrers in browsing $V_{out}(P)$;
average number of times a URL in the pattern acts as a referrer $V_{out}(P)=|P|$;
number of times URLs in the pattern act as referrers during the first t hours $V^t_{out}(P)$;
average number of times a URL in the pattern acts as a referrer during the first t hours $V^t_{out}(P)=|P|$;
fraction of times URLs in the pattern act as referrers during the first t hours $V^t_{out}(P)=V_{out}(P)$;

In some implementations of the method, the training is further based on a of the pattern $|P|$.

In some implementations of the method, at least one feature used for the training is weighted.

In some implementations of the method, each of the first crawling benefit parameter and the second crawling benefit parameter is calculated using equation:

$$r(u) = a_1 e^{\frac{\log(1-a_2)}{t}\Delta t}.$$

In some implementations of the method, the determining a crawling order comprises applying a crawling algorithm.

In some implementations of the method, the crawling algorithm is selected from a list of possible crawling algorithms that is configured to take into account the predicted popularity parameter and the predicted popularity decay parameter.

In some implementations of the method, the respective predicted popularity decay parameter is indicative of changes of the predicted popularity parameter over a time interval.

In some implementations of the method, the time interval is a predefined time interval from a creation of respective first new web page and second new web page.

In some implementations of the method, the method further comprises using a time when the respective first new web page and the second new web page were appreciated by the crawling application as a proxy for the creation day.

According to another broad aspect of the present technology, there is provided a server coupled to a communication network, the communication network having coupled thereto a first web resource server and a second web resource server. The server comprises: a communication interface for communication with an electronic device via a communication network, a processor operationally connected with the communication interface, the processor being configured to: appreciate a first new web page associated with the first web resource server; appreciate a second new web page associated with the second web resource server; determine a first crawling benefit parameter associated with the first new web page, the first crawling benefit parameter being based on a predicted popularity parameter and a predicted popularity decay parameter of the first new web page; determine a second crawling benefit parameter associated with the second new web page, the second crawling benefit parameter being based on a predicted popularity parameter and a predicted popularity decay parameter of the second new web page; based on the first crawling benefit parameter and the second crawling benefit parameter, determine a crawling order for the first new web page and the second new web page.

In some implementations of the server, the processor is further configured to appreciate a first old web page associated with one of the first web resource server and the second web resource server, the first old web page having been previously crawled.

In some implementations of the server, the processor is further configured to determine a third crawling benefit parameter associated with the first old web-page, the third crawling benefit parameter being based on a predicted popularity parameter and a predicted popularity decay parameter of at least one change associated with the first old web-page.

In some implementations of the server, the processor is further configured to, based on the first crawling benefit parameter, the second crawling benefit parameter and the third crawling benefit parameter, determine a crawling order for the first new web page, the second new web page and re-crawling of the first old web-page.

In some implementations of the server, the processor is further configured to estimate respective predicted popularity parameter and predicted popularity decay parameter associated with the first new web page and the second new web page using machine learning algorithm executed by the crawling server.

In some implementations of the server, the processor is further configured to train the machine learning algorithm.

In some implementations of the server, the training is based on at least one feature selected from a list of:

number of transitions to all URLs in the pattern P: $V_{in}(P)$;
average number of transitions to a URL in the pattern $V_{in}(P)=|P|$, where $|P|$ is the number of URLs in P;
number of transitions to all URL's in the pattern P during the first t hours: $V^t_{in}(P)$;
average number of transitions to a URL in the pattern P during the first t hours: $V^t_{in}(P)=|P|$;
fraction of transitions to all URL's in the pattern P during the first t hours: $V^t_{in}(P)=V_{in}(P)$.

In some implementations of the server, training is based on at least one feature selected from a list of:

number of times URLs in the pattern act as referrers in browsing $V_{out}(P)$;
average number of times a URL in the pattern acts as a referrer $V_{out}(P)=|P|$;
number of times URLs in the pattern act as referrers during the first t hours $V^t_{out}(P)$;
average number of times a URL in the pattern acts as a referrer during the first t hours $V^t_{out}(P)=|P|$;
fraction of times URLs in the pattern act as referrers during the first t hours $V^t_{out}(P)=V_{out}(P)$;

In some implementations of the server, the training is further based on a of the pattern $|P|$.

In some implementations of the server, at least one feature used for the training is weighted.

In some implementations of the server, each of the first crawling benefit parameter and the second crawling benefit parameter is calculated using equation:

$$r(u) = a_1 e^{\frac{\log(1-a_2)}{t}\Delta t}.$$

In some implementations of the server, to determine a crawling order, the processor is further configured to apply a crawling algorithm.

In some implementations of the server, the crawling algorithm is selected from a list of possible crawling algorithms that is configured to take into account the predicted popularity parameter and the predicted popularity decay parameter.

In some implementations of the server, the respective predicted popularity decay parameter is indicative of changes of the predicted popularity parameter over a time interval.

In some implementations of the server, time interval is a predefined time interval from a creation of respective first new web page and second new web page.

In some implementations of the server, the processor is further configured to use a time when the respective first new web page and the second new web page were appreciated by the crawling application as a proxy for the creation day.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

An Appendix is provided at the end of the present specification. The Appendix includes a copy of the published article entitled "Crawling policies based on web page popularity prediction" (marked as 34055-304 APPENDIX A) and a copy of the published article "Timely crawling of High-quality Ephemeral New Content" (marked as 34055-304 APPENDIX B). These articles provide additional background information, description of implementations of the present technology and examples. The entireties of these article are incorporated herein by reference in their entirety, in all those jurisdictions where such incorporation by reference is allowed.

DETAILED DESCRIPTION

Figure 1:
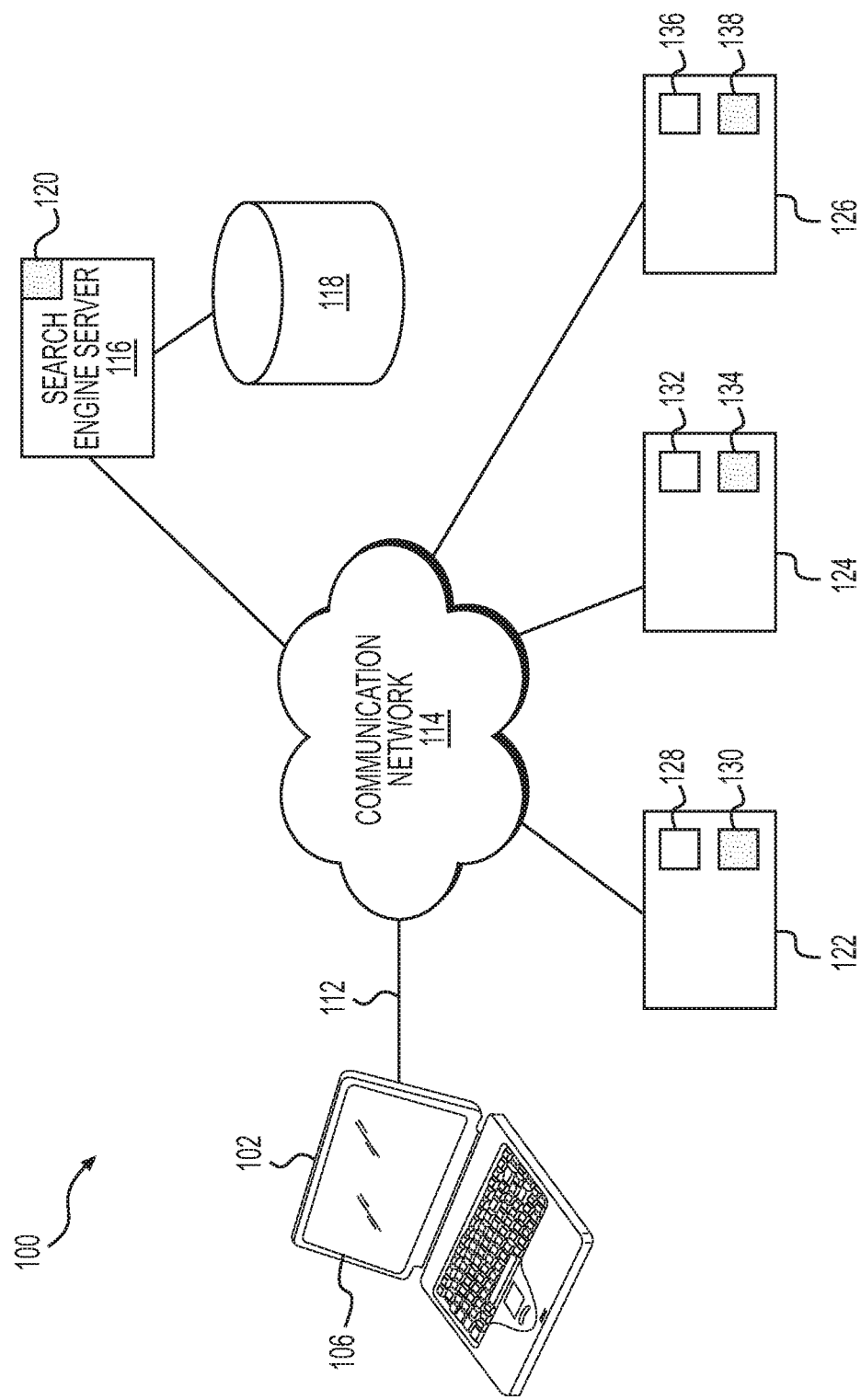
FIG. 1 is a schematic diagram of a system 100 implemented in accordance with an embodiment of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the electronic device 102 is implemented as a wireless communication device (smartphone), for example iPhone 5 smartphone, running iOS 6 (i.e. factory pre-set operating system), provided by Apple Corporation of Cupertino, Calif., United States of America. The electronic device 102 comprises hardware and/or software and/or firmware (or a combination thereof) to execute a search application 106. Generally speaking, the purpose of the search application 106 is to enable the user (not depicted) to execute a web search using a search engine. How the search application 106 is implemented is not particularly limited. One example of the search application 106 may be embodied in a user accessing a web site associated with a search engine to access the search application 106. For example, the search application can be accessed by typing in an URL associated with Yandex search engine at www.yandex.ru. It should be expressly understood that the search application 106 can be accessed using any other commercially available or proprietary search engine. In alternative non-limiting embodiments of the present technology, the search application 106 may be implemented as a browser application on a portable device (such as a wireless electronic device). It should be expressly understood that any other commercially available or proprietary browser application can be used for implementing non-limiting embodiments of the present technology.

Generally, speaking, the search application 106 is configured to receive from the user (not depicted) a "search string" and to provide search results that are responsive to the user query. How the user query is processed and how the search results are presented is generally known in the art and, as such, will not be described here at much length.

The electronic device 102 is coupled to a communication network 114 via a communication link 112. In some non-limiting embodiments of the present technology, the communication network 114 can be implemented as the Internet. In other embodiments of the present technology, the communication network 114 can be implemented differently, such as any wide-area communication network, local-area communication network, a private communication network and the like.

How the communication link 112 is implemented is not particularly limited and will depend on how the electronic device 102 is implemented. Recalling that the electronic device 102 can be implemented, in this example, as a smartphone, the communication link 112 can be wireless (such as the Wireless Fidelity, or WiFi® for short, Bluetooth® or the like).

It should be expressly understood that implementations for the electronic device 102, the communication link 112 and the communication network 114 are provided for illustration purposes only. As such, those skilled in the art will easily appreciate other specific implementational details for the electronic device 102, the communication link 112 and the communication network 114. As such, by no means, examples provided herein above are meant to limit the scope of the present technology.

To enable the user of the electronic device 102 to execute a search using the search application 106, coupled to the communication network 114 is a search engine server 116. The search engine server 116 can be implemented as a conventional computer server. In an example of an embodiment of the present technology, the search engine server 116 can be implemented as a Dell™ PowerEdge™ Server running the Microsoft™ Windows Server™ operating system. Needless to say, the search engine server 116 can be implemented in any other suitable hardware and/or software and/or firmware or a combination thereof. In the depicted non-limiting embodiment of present technology, the search engine server 116 is a single server. In alternative non-limiting embodiments of the present technology, the functionality of the search engine server 116 may be distributed and may be implemented via multiple servers.

The search engine server 116 is configured to access an index 118. In the depicted embodiment, the search engine server 116 is coupled to the index 118 via a dedicated link (not numbered). Alternatively, the search engine server 116 can access the index 118 via the communication network 114. Yet in other embodiments, the index 118 can be implemented as part of the search engine server 116.

The search engine server 116 can be configured to execute web searches. Functionality of the search engine server 116 is generally known, but briefly speaking, the search engine 115 is configured to: (i) receive a search query from the electronic device 102; (ii) to process the search query (normalize the search query, etc); (iii) to execute a search for web resources that are responsive to the search query by accessing the index 118, the index 118 containing an index of crawled web resources and (iv) to return a ranked list of search results to the electronic device 102 for the search application to output to the user the SERP containing links to web resources that are responsive to the search query.

The search engine 116 is also configured to execute a crawling function and, to that end, comprises a crawling application 120.

For the purposes of illustration, let it be assumed that provided within the system 100 is a first web resource server 122, a second web resource server 124 and a third web resource server 126. Much akin to the search engine server 116, each of the first web resource server 122, the second web resource server 124 and the third web resource server 126 can be implemented as a conventional computer server. In an example of an embodiment of the present technology, each of the first web resource server 122, the second web resource server 124 and the third web resource server 126 can be implemented as a Dell™ PowerEdge™ Server running the Microsoft™ Windows Server™ operating system. Needless to say, each of the first web resource server 122, the second web resource server 124 and the third web resource server 126 can be implemented in any other suitable hardware and/or software and/or firmware or a combination thereof. Additionally, a given one of the first web resource server 122, the second web resource server 124 and the third web resource server 126 can be implemented differently from another one or all of the other ones of the first web resource server 122, the second web resource server 124 and the third web resource server 126.

Also, in the depicted non-limiting embodiment of present technology, each of the first web resource server 122, the second web resource server 124 and the third web resource server 126 is a single server. In alternative non-limiting embodiments of the present technology, the functionality of each of the first web resource server 122, the second web resource server 124 and the third web resource server 126 may be distributed and may be implemented via multiple servers.

Each of the first web resource server 122, the second web resource server 124 and the third web resource server 126 is configured to host respective web resources being accessible by the electronic device 102 via the communication network 114. As has been mentioned previously, the respective web resources can be accessed by the electronic device 102 by means of typing in an URL or executing a web search using the search engine server 116.

In the depicted embodiment, the first web resource 122 hosts a first old web resource 128 and a first new web resource 130. The second web resource 124 hosts a second old web resource 132 and a second new web resource 134. The third web resource 126 hosts a third old web resource 136 and a third new web resource 138.

For the purposes of the present technology an "old web resource" shall denote a web resource that has been crawled by the crawling application 120 of the search engine server 116. Put another way, the content of the "old web resource" has been crawled, indexed and information representative thereof has been stored in the index 118. On the flip side, a "new web resource" shall denote a web resource that has not been previously crawled by the crawling application 120 of the search engine server 116. It should be noted, however, that the denotation of the "old web resource" does not prevent a situation where the content of the old web resource has been updated and, therefore, the crawled version of the web site and the current version of the web site may actually differ.

In some embodiments and generally speaking, the crawling application 120 is configured to determine which ones and in which order of the first new web resource 130, the second old web resource 132 and the third new web resource 138 to crawl. In additional embodiments, the crawling application 120 can determine which ones and in which order of the first old web resource 128, the second old web resource 132 and the third old web resource 136 to re-crawl. In yet additional embodiments of the present technology, the scheduling application 120 is configured to balance its available resources between crawling of the new resources (such as the first new web resource 130, the second old web resource 132 and the third new web resource 138) and re-crawling of old (or previously crawled) resource (such as the first old web resource 128, the second old web resource 132 and the third old web resource 136).

In some embodiments of the present technology, as part of executing the crawling function, the crawling application 120 executes the following routines. It should be noted that how the new web resources (such as the first new web resource 130, the second old web resource 132 and the third new web resource 138) are discovered is not limited and any of the available prior art approaches can be used. For all the examples to be provided herein below, it is assumed that the crawling application 120 is aware of the new web resources (such as the first new web resource 130, the second old web resource 132 and the third new web resource 138, as well as all other newly available web resources that need to be crawled).

Also, for the purposes of the examples to be presented below, it shall be assumed that the cost of resources required to crawl and re-crawl is the same irrespective of which web page is being crawled. Hence, it can be concluded that it takes the same time $T_{crawl}$ for the crawling application 120 to download any given page from the new resource to be crawled (such as the first new web resource 130, the second old web resource 132 and the third new web resource 138) or the old resource to be re-crawled (such as the first old web resource 128, the second old web resource 132 and the third old web resource 136).

In some embodiments, the crawling application 120 is configured to predict a popularity parameter p(u) of a given page and a popularity decay parameter λ(u) of the given page—i.e. one of the newly created pages (such as the first new web resource 130, the second old web resource 132 and the third new web resource 138) or one of the old web-pages that potentially needs re-crawling (such as the first old web resource 128, the second old web resource 132 and the third old web resource 136).

Estimation of the Crawling Benefit Parameter that is Based on the Predicted Popularity Parameter and the Predicted Popularity Decay Parameter Generally speaking, the popularity parameter p(u) represents the total number of visits to the given web page. In some embodiments, the distribution of the number of visits over all web pages in a given data set may be heavy tailed. In those circumstances (but not necessarily limited to those circumstances), the crawling application 120 may predict a logarithm of the popularity parameter p(u) rather than the actual value of the popularity parameter p(u). This is based on the fact that for large values of the popularity parameter p(u) the exact value itself may not be critical, but rather the magnitude of the popularity parameter p(u) may be important for the crawling application 120.

The crawling application then determines the popularity parameter p(u) for a pre-defined time interval after the URL has been discovered—namely popularity over time parameter $p_t(u)$. In some embodiments of the present technology, the crawling application 120 may know the exact creation date of the given web page. In other embodiments, the crawling application 120 use the date and time when the given web page was "discovered" by the crawling application 120 as the proxy date and time for when the given web resource was created. In yet additional embodiments, the crawling application 120 may apply one of the known algorithms for determining the creation date and/or time of the given web resource.

The machine learning algorithm utilized by the crawling application 120 is trained (will be explained below) to predict the share of total visits that will happen within the pre-defined time interval (such as within pre-defined t hours after creation of the wen page) using:

$$P_u(t) \approx p(u)e^{-\lambda(u)t} \qquad \text{Equation 1}$$

The crawling application 120 then estimates the popularity decay parameter λ(u). From the formula:

$$p(u) - p_t(u) \approx p(u)e^{-\lambda(u)t} \qquad \text{Equation 2}$$

It follows that:

$$1 - a_2 = 1 - \frac{p_t(u)}{p(u)} \approx e^{-\lambda(u)t} \qquad \text{Equation 3}$$

Therefore $$1 - a_2 = 1 - \frac{p_t(u)}{p(u)} \approx e^{-\lambda(u)t}$$ Equation 4

Taking a logarithm, we get $\log(1-a_2) = -\lambda(u)t$ and, therefore, the crawling application 120 can estimate the popularity decay parameter $\lambda(u)$ as:

$$\hat{\lambda}(u) = -\frac{\log(1-a_2)}{t}$$ Equation 5

Therefore, the estimated expected profit of crawling the given resource u with the delay $\Delta t$ after its appearance is:

$$r(u) = a_1 e^{\frac{\log(1-a_2)}{t}\Delta t}$$

Within Equation 6,
$a_1$ is estimation of the total visits (p);
$a_2$ is estimation of $p_t(u)/p(u)$, or in other words an estimation of the ratio of the number of visits during the time t after the creation to overall number of visits;
t is a pre-defined time interval after the creation of the web resource;
$\Delta t$ current age of the web resource or, in other words, the time interval between creation of the web page and the current time.

Thus, the estimated expected profit of crawling estimated using Equation 6 can be considered to be a crawling benefit parameter that is based on the predicted popularity parameter and the predicted popularity decay parameter.

Features Used for Machine Learning Training

As has been alluded to above, the crawling application 120 uses a machine learning algorithm for implementing the model (namely, for predicting parameters $a_1$ and $a_2$). As is known to those of skill in the art, the machine learning algorithm needs to be "trained". As is also known to those of skill in the art, the machine learning algorithm uses a set of features to be trained.

For each known domain, the crawling application 120 constructs a pattern tree to organize URLs based on their syntax structure. Several prior art techniques are available for implementing this step and the specific implementation is not particularly limited.

For each URL u, the crawling application 120, analyzes the corresponding pattern P (i.e. the corresponding node in the tree). In some embodiments of the present technology, the crawling application 120 can monitor and compile one or more of:

Transitions to the pattern:
The number of transitions to all URLs in the pattern P: $V_{in}(P)$.
The average number of transitions to a URL in the pattern $V_{in}(P)=|P|$, where $|P|$ is the number of URLs in P.
The number of transitions to all URL's in the pattern P during the first t hours: $V^t_{in}(P)$.
The average number of transitions to a URL in the pattern P during the first t hours: $V^t_{in}(P)=|P|$.
The fraction of transitions to all URL's in the pattern P during the first t hours: $V^t_{in}(P)=V_{in}(P)$.

Transitions from the pattern:
The number of times URLs in the pattern act as referrers in browsing $V_{out}(P)$.
The average number of times a URL in the pattern acts as a referrer $V_{out}(P)=|P|$.
The number of times URLs in the pattern act as referrers during the first t hours $V^t_{out}(P)$.
The average number of times a URL in the pattern acts as a referrer during the first t hours $V^t_{out}(P)=|P|$.
The fraction of times URLs in the pattern act as referrers during the first t hours $V^t_{out}(P)=V_{out}(P)$.

In some embodiments of the present technology, the crawling application 120 further takes into account the size of the pattern $|P|$.

The features within the first group listed above correspond to the popularity of associated pages. For example, for the crawling application 120 to predict the overall popularity of a given web page, the crawling application 120 can compute the popularity of "similar" URLs taken from the corresponding pattern. Similarly, the historical value $V^t_{in}(p)/V_{in}(P)$ is deemed to correlate with $a_2 = p_t(u)/p(u)$.

The second group of features corresponds to the importance of pages defined as the number of transitions from pages. The correlation between the number of transitions from pages and their popularity in terms of visits exists, since in order to move from a page $p_1$ to a page $p_2$, a user should visit $p_1$.

In some embodiments, the features of the first group can be given more weight than the features of the second group.

It should be expressly understood that the examples of features that can be used for training provided above are not meant to be exhaustive. As such, a number of alternative or additional features could be used. These include, but are not limited to: (a) a source which was used to discover the URL of the newly discovered web page; (b) a number of a pre-determined external media that refers to the URL, such as a number of "tweets" for example, (c) the total number of known incoming links to the URL; (c) the number of user transitions to the URL and the like.

Examples and Experiments

All the experiments conducted were based on a fully anonymized web page visits log recorded by a search engine browser toolbar, used by millions of people across different countries. More specifically, the inventors extracted all records made in the 2-month period from Jul. 1, 2013 to Aug. 31, 2013. From the set of all pages P appeared in logs during this time frame, inventors extracted pages which had non-zero visits on the first or on the last day in order to focus only on new web pages which are popular during the considered period of time. Inventors obtained a smaller set of pages P'.

Let D be the set of all corresponding domains. Due to test resource constraints, inventors removed all domains with more then 50 K pages from D and obtained a new set D'. Inventors removed large domains form the dataset since the experiments were not conducted in a production environment using production-level equipment and, hence, the algorithm of constructing the pattern tree, was computationally expensive for the purposes of the experiment using experiment-level equipment. Finally, inventors sampled a random subset of 100 domains from the set D'.

As a result, inventors final dataset consisted of 100 random domains and all pages from these domains with non-zero visits on the first or on the last day of the considered time frame. URLs which were visited in July, but were not visited in June or August, were used to train the popularity prediction model. URLs which were visited in August, but were not visited in July or September, were used to evaluate the performance of the algorithms. Each of these two sets contains 650 K URLs. Table 1 below reproduces the importance of the features used.

TABLE 1

| Feature | Importance |
| --- | --- |
| $V_{in}^{24}(P)/|P|$ | 38% |
| $V_{in}(P)/|P|$ | 29% |
| $V_{out}(P)/|P|$ | 8% |
| $V_{in}^{24}(P)/V_{in}(P)$ | 7% |
| $V_{in}(P)$ | 4% |
| $V_{out}(P)$ | 4% |
| $|P|$ | 3% |
| $V_{out}^{24}(P)$ | 2% |
| $V_{out}^{24}(P)/|P|$ | 2% |
| $V_{out}^{24}(P)/V_{out}(P)$ | 2% |
| $V_{in}^{24}(P)$ | 1% |

Long-Term Popularity Prediction

First, inventors analyzed the popularity prediction model. In particular, inventors compared different orderings of pages based on their predicted popularity. It was observed and generally speaking, the accurate ordering of pages according to their long-term popularity considerably improves the quality of a crawling application 120. For the purposes of the experiments, the algorithm described herein above was used for the predictions for both the actual value of popularity and the rate of popularity decay for ranking the URLs.

For the inventors' experiments, inventors took t=24 hours. The importance of features used is presented in Table 1 above. Inventors sorted features according to the weighted contribution into the prediction model. It measures weighted improvement of the loss function over all employments of a feature during the learning process. As shown in Table 1, the most important features are the average long-term popularity of URLs in a pattern and the average sort-term popularity of URLs in a pattern.

Crawling Strategies Comparison

Inventors have tested the algorithm presented herein against several known prior art approaches.

Rank-by-Average-Visit.

According to this algorithm, at each step the page with the highest total popularity is crawled. The total popularity is predicted according to Rank-by-Average-Visit method known to those skill in the art. In other words, at each step the crawling application 120 selects that web page for crawling that has the highest value of the average number of transitions to URLs in the pattern corresponding to the considered URL.

Rank-by-$a_1$.

At each step the page with the highest total popularity is crawled, whereby total popularity is predicted by the machine learning algorithms described herein.

Exponential Method (Predicted $a_2$).

In this case, the crawling application 120 takes the dynamics of popularity into account, as it was described above. Both the parameters $a_1$ and $a_2$ are predicted by the machine learning algorithm.

Exponential Method (Ideal $a_2$, Also Referred to Herein, from Time to Time, as "Oracle $a_2$").

This method is similar to the previous one, but instead of predicted $a_2$, the crawling applications 120 considers the actual value for the predicted popularity value and the predicted popularity decay value, i.e., $a_2=p_t(u)/p(u)$.

The results obtained by conducted experiments can be seen in Table 2. Here the inventors compare all the algorithms with different crawl rates. It should be noted that CR=0:1 allows crawling about half of all the web pages in the experiment dataset during the considered month. If follows from the Table 2 that the better prediction of popularity obtained by the machine learning algorithm, which is implemented in accordance with non-limiting embodiments of the present technology, helps to significantly improve the quality of the crawling application 120.

TABLE 2

Comparison of crawling strategies: the fraction of visits covered for different crawl rates.

| Algorithm | CR = 0.01 (5% URLs) | CR = 0.02 (10% URLs) | CR = 0.04 (20% URLs) | CR = 0.1 (50% URLs) |
| --- | --- | --- | --- | --- |
| Rank-by-Average-Visit | 0.24 | 0.34 | 0.43 | 0.53 |
| Rank-by-$a_1$ | 0.32 | 0.42 | 0.51 | 0.80 |
| Exponential (predicted $a_2$) | 0.31 | 0.40 | 0.49 | 0.58 |
| Exponential (oracle $a_2$) | 0.36 | 0.44 | 0.54 | 0.84 |

It should be expressly understood that other methods for predicting the interest decay can be used. Those skilled in the art, having benefitted from the teachings of the present technology, will be able to select a proper crawler scheduling algorithms that takes into the account the predicted popularity parameter and the predicted popularity decay parameter as has been disclosed in accordance with embodiments of the present technology.

Given the architecture of the system 100 of FIG. 1 and the examples provided herein above, it is possible to execute a method of setting up a crawling schedule. The method can be executable at the search engine server 116. It should be recalled that the search engine server 116 can execute the crawling application 120 and, as such, it can sometimes be referred to as a "crawling server".

It will be recalled that the search engine server 116 is coupled to the communication network 114 and that also coupled to the communication network 114 are the first web resource server 122 and the second web resource server 124 (these being representative of multiple web resources servers potentially coupled to the communication network 114).

Figure 2:
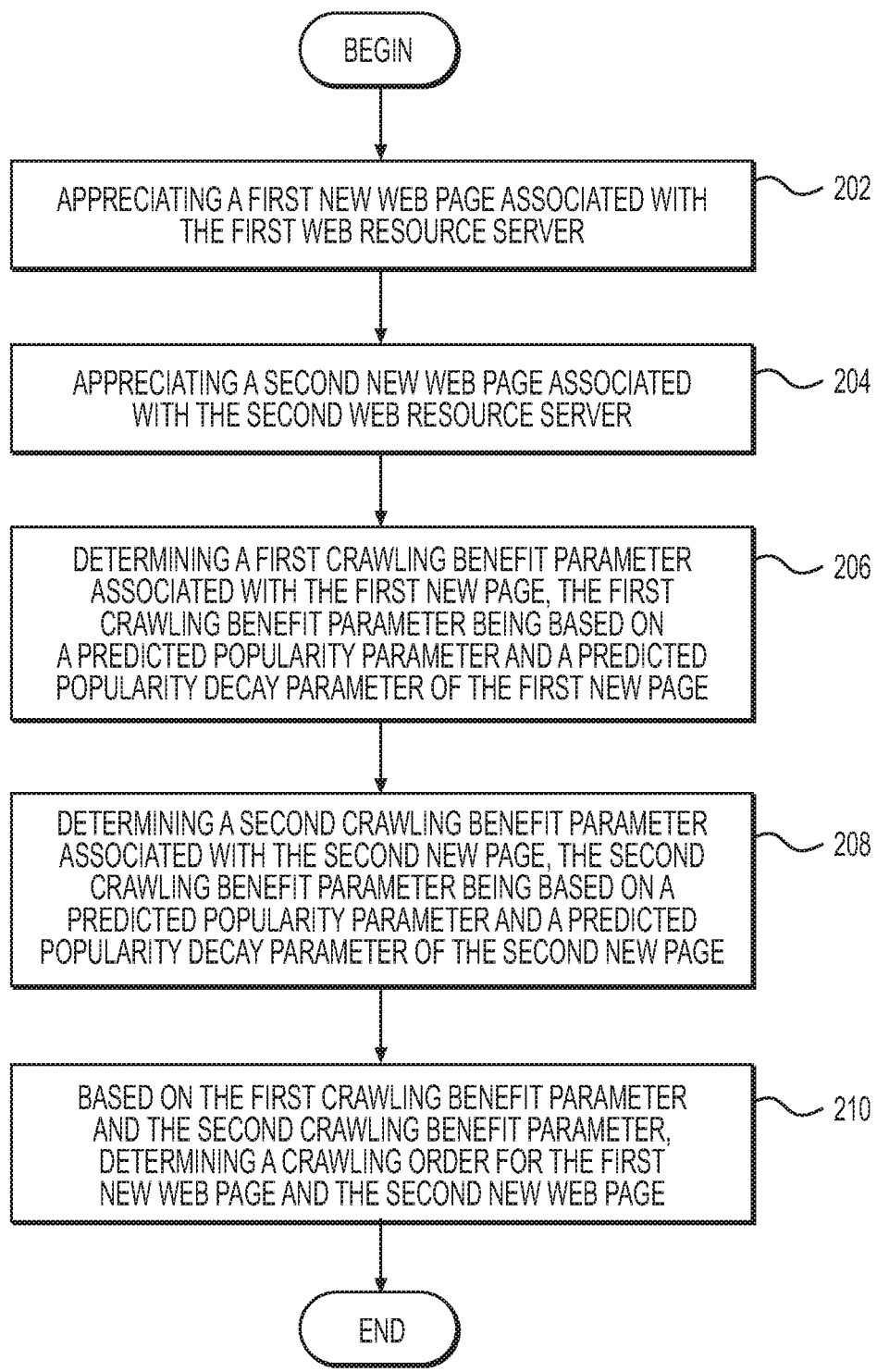
FIG. 2 depicts a flow chart of a method 200, the method being executed within the system 100 and being executed in accordance with non-limiting embodiments of the present technology.

With reference to FIG. 2, there is depicted a flow chart of a method 200, the method being executed in accordance with non-limiting embodiments of the present technology.

Step 202—Appreciating a First New Web Page Associated with the First Web Resource Server The method starts at stem 202, where the search engine server 116 appreciates a first new web page associated with the first web resource server 122. As has been alluded above, discovering a given web page for crawling can be implemented any known technique.

Step 204—Appreciating a Second New Web Page Associated with the Second Web Resource Server At step 204, the search engine server 116 appreciates a second new web page associated with the second web resource server. As has been alluded above, discovering a given web page for crawling can be implemented any known technique.

Step 206—Determining a First Crawling Benefit Parameter Associated with the First New Web Page, the First Crawling Benefit Parameter being Based on a Predicted Popularity Parameter and a Predicted Popularity Decay Parameter of the First New Web Page Next, at step 206, the search engine server 116 determines a first crawling benefit parameter associated with the first new web page, the first crawling benefit parameter being based on a predicted popularity parameter and a predicted popularity decay parameter of the first new web page.

In some embodiments of the method 200, the first crawling benefit parameter is calculated using equation:

$$r(u) = a_1 e^{\frac{\log(1-a_2)}{t}\Delta t}$$

Step 208—Determining a Second Crawling Benefit Parameter Associated with the Second New Web Page, the Second Crawling Benefit Parameter being Based on a Predicted Popularity Parameter and a Predicted Popularity Decay Parameter of the Second New Web Page At step 208, the search engine server 116 determines a second crawling benefit parameter associated with the second new web page, the second crawling benefit parameter being based on a predicted popularity parameter and a predicted popularity decay parameter of the second new web page.

In some embodiments of the method 200, the first crawling benefit parameter is calculated using equation:

$$r(u) = a_1 e^{\frac{\log(1-a_2)}{t}\Delta t}$$

In some embodiments of the method, the respective predicted popularity decay parameter (respectively associated with the first new web page or the second new web page) is indicative of changes of the predicted popularity parameter over a time interval.

In some implementations of the method, the time interval is a predefined time interval from a creation time of respective first new web page and second new web page.

As has been alluded to above, the method may further comprise using a time when the respective first new web page and the second new web page were appreciated by the crawling application as a proxy for the creation day.

In some embodiments of the present technology, before executing steps 206 and 208, the search engine server 116 first estimates respective predicted popularity parameter and predicted popularity decay parameter associated with the first new web page and the second new web page using machine learning algorithm executed by the crawling server.

In some embodiments of the method 200, the method further comprises training the machine learning algorithm, which can be executed before step 202, for example. The training can be based on at least one feature selected from a list of:
  number of transitions to all URLs in the pattern P: $V_{in}(P)$;
  average number of transitions to a URL in the pattern $V_{in}(P)=|P|$, where $|P|$ is the number of URLs in P;
  number of transitions to all URL's in the pattern P during the first t hours: $V^t_{in}(P)$;
  average number of transitions to a URL in the pattern P during the first t hours: $V^t_{in}(P)=|P|$;
  fraction of transitions to all URL's in the pattern P during the first t hours: $V^t_{in}(P)=V_{in}(P)$.
Alternatively or additionally, training can be based on at least one feature selected from a list of:

number of times URLs in the pattern act as referrers in browsing $V_{out}(P)$;
  average number of times a URL in the pattern acts as a referrer $V_{out}(P)=|P|$;
  number of times URLs in the pattern act as referrers during the first t hours $V^t_{out}(P)$;
  average number of times a URL in the pattern acts as a referrer during the first t hours $V^t_{out}(P)=|P|$;
  fraction of times URLs in the pattern act as referrers during the first t hours $V^t_{out}(P)=V_{out}(P)$;

In some embodiments of the present technology, the training is further based on a of the pattern |P|. In other embodiments, at least one feature used for said training is weighted.

Step 210—Based on the First Crawling Benefit Parameter and the Second Crawling Benefit Parameter, Determining a Crawling Order for the First New Web Page and the Second New Web Page At stem 210, the search engine server 116, based on the first crawling benefit parameter and the second crawling benefit parameter, determines a crawling order for the first new web page and the second new web page.

In some embodiments of the present technology, as part of executing step 210, the search engine server 116 prioritizes the web page with a higher crawling benefit parameter over web pages with a lower crawling benefit parameter.

In some embodiments of the method 200, the step of determining the crawling order may comprise applying a crawling algorithm. As has been described above, the crawling algorithm is selected from a list of possible crawling algorithms that is configured to take into account a predicted popularity parameter and a predicted popularity decay parameter.

Optional Enhancements of the Method 200

In some embodiments of the present technology, method 200 can be applied to balancing of resources of the crawling application 120 between crawling of newly discovered web pages and re-crawling of old web pages—i.e. web pages that have been previously crawled and may have changed (and hence may need to be re-crawled and re-indexed to properly show up in searches).

To that end, the method 200, may optionally include a step of appreciating a first old web page associated with one of the first web resource server 122 and the second web resource server 124 (or any other web resource server potentially present within the architecture of FIG. 1). The first old web page has been previously crawled by the crawling application 120 and may (or may not) have changed since the original crawling operation.

In some embodiments of the method 200, the method 200 further comprises determining a third crawling benefit parameter associated with the first old web-page, the third crawling benefit parameter being based on a predicted popularity parameter and a predicted popularity decay parameter of at least one change associated with the first old web-page. The method 200 further comprises, based on the first crawling benefit parameter, the second crawling benefit parameter and the third crawling benefit parameter, determining a crawling order for the first new web page, the second new web page and re-crawling of the first old web-page.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of setting up a crawling schedule, the method executable at a crawling server, the crawling server coupled to a communication network, the communication network having coupled thereto a first web resource server and a second web resource server, the method comprising:
   acquiring a first new web page associated with the first web resource server;
   acquiring a second new web page associated with the second web resource server;
   calculating a first crawling benefit parameter associated with the first new web page, the first crawling benefit parameter being based on:
      a first predicted popularity parameter being indicative of long-term popularity of the first new web page, wherein the long-term popularity of the first new web page represents total number of visits to the first new web page, and
      a first predicted popularity decay parameter of the first new web page, the first predicted popularity decay parameter being indicative of a rate at which the popularity of the first web page increases and decreases with time,
      the first predicted popularity decay parameter having been predicted based on short-term popularity of the first web page indicative of a number of visits to the first web page over a predefined time interval after the first web page has been discovered, the long term popularity of the first new web page, and the predefined time interval and current age of the first new web page, wherein
         the larger the first predicted popularity parameter is, the larger the first crawling benefit parameter is, and wherein
         the first crawling benefit parameter decreases at the rate represented by the first predicted popularity decay parameter;
   calculating a second crawling benefit parameter associated with the second new web page, the second crawling benefit parameter being based on:
      a second predicted popularity parameter being indicative of long-term popularity of the second new web page, wherein the long-term popularity of the second new web page represents total number of visits to the second new web page, and
      a second predicted popularity decay parameter of the second new web page, the second predicted popularity decay parameter being indicative of a rate at which the popularity of the second web page increases and decreases with time,
      the second predicted popularity decay parameter having been predicted based on a short-term popularity of the second web page indicative of a number of visits to the second web page over a predefined time interval after the second web page has been discovered, the long term popularity of the second new web page, and the predefined time interval and current age of the second new web page, wherein
         the larger the second predicted popularity parameter is, the larger the second crawling benefit parameter is, and wherein
         the second crawling benefit parameter decreases at the rate represented by the second predicted popularity decay parameter; and
   based on the first crawling benefit parameter and the second crawling benefit parameter, determining a crawling order for the first new web page and the second new web page, such that the first new page and the second new page are ordered in a descending order of an associated one of the first crawling benefit parameter and the second crawling benefit parameter.

2. The method of claim 1, further comprising acquiring a first old web page associated with one of the first web resource server and the second web resource server, the first old web page having been previously crawled.

3. The method of claim 2, further comprising calculating a third crawling benefit parameter associated with the first old web-page, the third crawling benefit parameter being based on a predicted popularity parameter and a predicted popularity decay parameter of at least one change associated with the first old web-page.

4. The method of claim 3, further comprising, based on the first crawling benefit parameter, the second crawling benefit parameter and the third crawling benefit parameter, determining a crawling order for the first new web page, the second new web page and re-crawling of the first old web-page.

5. The method of claim 1, further comprising estimating respective predicted popularity parameter and predicted popularity decay parameter associated with the first new web page and the second new web page using machine learning algorithm executed by the crawling server.

6. The method of claim 5, further comprising training the machine learning algorithm.

7. The method of claim 6, wherein said training is based on at least one feature selected from a list of:
   number of transitions to all URLs in the pattern P: $V_{in}(P)$;
   average number of transitions to a URL in the pattern $V_{in}(P)=|P|$, where $|P|$ is the number of URLs in P;
   number of transitions to all URL's in the pattern P during the first t hours: $V^t_{in}(P)$;
   average number of transitions to a URL in the pattern P during the first t hours: $V^t_{in}(P)=|P|$;
   fraction of transitions to all URL's in the pattern P during the first t hours: $V^t_{in}(P)=V_{in}(P)$.

8. The method of claim 7, wherein said training is further based on a of the pattern $|P|$.

9. The method of claim 7, wherein at least one feature used for said training is weighted.

10. The method of claim 6, wherein said training is based on at least one feature selected from a list of:
   number of times URLs in the pattern act as referrers in browsing $V_{out}(P)$;
   average number of times a URL in the pattern acts as a referrer $V_{out}(P)=|P|$;
   number of times URLs in the pattern act as referrers during the first t hours $V^t_{out}(P)$;
   average number of times a URL in the pattern acts as a referrer during the first t hours $V^t_{out}(P)=|P|$;
   fraction of times URLs in the pattern act as referrers during the first t hours $V^t_{out}(P)=V_{out}(P)$.

11. The method of claim 1, wherein each of the first crawling benefit parameter and the second crawling benefit parameter is calculated using equation:

$$r(u) = a_1 e^{\frac{\log(1-a_2)}{t}\Delta t},$$

where $a_1$ is an estimation of a number of total visits (p);
$a_2$ is estimation of $p_t(u)/p(u)$;
$p_t(u)$ is an estimation of a number of visits during a predefined time interval t after the creation of the web resource; and
$\Delta t$ is a current age of the web resource.

12. The method of claim 1, wherein said determining a crawling order comprises applying a crawling algorithm.

13. The method of claim 12, wherein the crawling algorithm is selected from a list of possible crawling algorithms that is configured to take into account the predicted popularity parameter and the predicted popularity decay parameter.

14. The method of claim 1, wherein the method further comprises using a time when the respective first new web page and the second new web page were acquired by the crawling application as a proxy for the creation day.

15. The method of claim 1, wherein:
the first predicted popularity decay parameter has been predicted based on short-term popularities of a first plurality of web pages, each of the first plurality of web pages being similar to the first web page, the short-term popularity of a given web page being indicative of a number of visits to the given web page over a predefined time interval after the given web page was discovered;
the second predicted popularity decay parameter has been predicted based on short-term popularities of a second plurality of web pages, each of the second plurality of web pages being similar to the second web page.

16. A server coupled to a communication network, the communication network having coupled thereto a first web resource server and a second web resource server, the server comprising:
a communication interface for communication with an electronic device via a communication network, a processor operationally connected with the communication interface, the processor being configured to:
acquire a first new web page associated with the first web resource server;
acquire a second new web page associated with the second web resource server;
calculate a first crawling benefit parameter associated with the first new web page, the first crawling benefit parameter being based on:
a first predicted popularity parameter being indicative of long-term popularity of the first new web page, wherein the long-term popularity of the first new web page represents total number of visits to the first new web page, and
a first predicted popularity decay parameter of the first new web page, the first predicted popularity decay parameter being indicative of a rate at which the popularity of the first web page increases and decreases with time,
the first predicted popularity decay parameter having been predicted based on a short-term popularity of the first web page indicative of a number of visits to the first web page over a predefined time interval after the first web page has been discovered, the long term popularity of the first new web page, and the predefined time interval and current age of the first new web page, wherein
the larger the first predicted popularity parameter is, the larger the first crawling benefit parameter is, and wherein
the first crawling benefit parameter decreases at the rate represented by the first predicted popularity decay parameter;
calculate a second crawling benefit parameter associated with the second new web page, the second crawling benefit parameter being based on:
a second predicted popularity parameter being indicative of long-term popularity of the second new web page, wherein the long-term popularity of the second new web page represents total number of visits to the second new web page, and
a second predicted popularity decay parameter of the second new web page, the second predicted popularity decay parameter being indicative of a rate at which the popularity of the second web page increases and decreases with time,
the second predicted popularity decay parameter having been predicted based on short-term popularity of the second web page indicative of a number of visits to the second web page over a predefined time interval after the second web page has been discovered, the long term popularity of the second new web page, and the predefined time interval and current age of the second new web page, wherein
the larger the second predicted popularity parameter is, the larger the second crawling benefit parameter is, and wherein
the second crawling benefit parameter decreases at the rate represented by the second predicted popularity decay parameter; and
based on the first crawling benefit parameter and the second crawling benefit parameter, determine a crawling order for the first new web page and the second new web page, such that the first new page and the second new page are ordered in a descending order of an associated one of the first crawling benefit parameter and the second crawling benefit parameter.

17. The server of claim 16, the processor being further configured to acquire a first old web page associated with one of the first web resource server and the second web resource server, the first old web page having been previously crawled.

18. The server of claim 16, the processor being further configured to estimate respective predicted popularity parameter and predicted popularity decay parameter associated with the first new web page and the second new web page using machine learning algorithm executed by the crawling server.

19. The server of claim 18, the processor being further configured to train the machine learning algorithm.

20. The server of claim 16, wherein:
the first predicted popularity decay parameter has been predicted based on short-term popularities of a first plurality of web pages, each of the first plurality of web pages being similar to the first web page, the short-term popularity of a given web page being indicative of a number of visits to the given web page over a predefined time interval after the given web page was discovered;
the second predicted popularity decay parameter has been predicted based on short-term popularities of a second plurality of web pages, each of the second plurality of web pages being similar to the second web page.

* * * * *